(12) United States Patent
Omoda et al.

(10) Patent No.: US 11,467,082 B2
(45) Date of Patent: Oct. 11, 2022

(54) METHOD FOR PREDICTING CORROSION LOSS OF METAL MATERIAL, METHOD FOR SELECTING METAL MATERIAL, AND DEVICE FOR PREDICTING CORROSION LOSS OF METAL MATERIAL

(71) Applicant: JFE STEEL CORPORATION, Tokyo (JP)

(72) Inventors: Masataka Omoda, Tokyo (JP); Kazuhiro Nakatsuji, Tokyo (JP); Daisuke Mizuno, Tokyo (JP); Yusuke Yoshinari, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 300 days.

(21) Appl. No.: 16/959,924

(22) PCT Filed: Dec. 20, 2018

(86) PCT No.: PCT/JP2018/047021
§ 371 (c)(1),
(2) Date: Jul. 2, 2020

(87) PCT Pub. No.: WO2019/135361
PCT Pub. Date: Jul. 11, 2019

(65) Prior Publication Data
US 2021/0072144 A1  Mar. 11, 2021

(30) Foreign Application Priority Data
Jan. 5, 2018  (JP) .............................. JP2018-000561

(51) Int. Cl.
*G01N 17/00*  (2006.01)

(52) U.S. Cl.
CPC .................................. *G01N 17/006* (2013.01)

(58) Field of Classification Search
CPC ...................................................... G01N 17/006
(Continued)

(56) References Cited

FOREIGN PATENT DOCUMENTS

| JP | 3909057 B2 | 4/2007 |
| JP | 2008-224405 A | 9/2008 |

(Continued)

OTHER PUBLICATIONS

Kim et al. Machine Translation of KR 20180047073 A. Filed Oct. 2016. Published May 2018. Accessed Jun. 2022. (Year: 2018).*

(Continued)

*Primary Examiner* — Walter L Lindsay, Jr.
*Assistant Examiner* — Philipmarcus T Fadul
(74) *Attorney, Agent, or Firm* — Oliff PLC

(57) ABSTRACT

A method of predicting a corrosion loss of a metal material, the method including: inputting a prediction request point including a use period of the metal material for which a corrosion loss is desired to be predicted and second environmental parameters indicating a use environment of the metal material in the use period; calculating a similarity degree between first environmental parameters in corrosion loss data and the second environmental parameters in the prediction request point; dimensionally reducing the first environmental parameters in the corrosion loss data to a latent variable taking the similarity degree into consideration; and predicting a corrosion loss of the metal material for the prediction request point based on a prediction expression constructed using the latent variable and the similarity degree.

14 Claims, 5 Drawing Sheets

(58) Field of Classification Search
USPC .......................................................... 73/866
See application file for complete search history.

(56) References Cited

FOREIGN PATENT DOCUMENTS

| | | |
|---|---|---|
| JP | 4143018 B2 | 9/2008 |
| JP | 4706254 B2 | 6/2011 |
| JP | 2012-13673 A | 1/2012 |
| JP | 5066160 B2 | 11/2012 |
| JP | 5066955 B2 | 11/2012 |
| JP | 5684552 B2 | 3/2015 |
| JP | 5895522 B2 | 3/2016 |

OTHER PUBLICATIONS

"Corrosion of metals and alloys—Corrosivity of atmospheres—Classification, determination and estimation;" International Standard ISO 9223; 2012; 22pp.
Kage et al.; "Prediction for Corrosion Loss of Weathering Steels;" JFE GIHO; 2007; pp. 62-66; No. 18.
Kim et al.; "Sample selection to construct accurate locally weighted PLS models;" The 54th Japan Joint Automatic Control Conference; 2011; pp. 1594-1597.
Yasukawa et al.: "Multiple Regression Analysis on Atmospheric Corrosion of Carbon Steel with Environmental Factors in Niigata City;" Corrosion Engineering; 1983; pp. 195-201; vol. 32, No. 4.
Sakashita et al.; "Corrosion Prediction Method for Ni-added High-performance Weathering Steel;" Kobe Steel Engineering Reports; 2011; pp. 28-31; vol. 61, No. 2.
"Joint research report on application of corrosion resisting steel to bridges (XVIII);" Institute of Civil Engineering of the Ministry of Construction, the Kozai Club, and Japan Bridge Association; 1993.
Mar. 26, 2019 Search Report issued in International Patent Application No. PCT/JP2018/047021.

* cited by examiner

METHOD FOR PREDICTING CORROSION LOSS OF METAL MATERIAL, METHOD FOR SELECTING METAL MATERIAL, AND DEVICE FOR PREDICTING CORROSION LOSS OF METAL MATERIAL

FIELD

The present invention relates to a method for predicting a corrosion loss of a metal material, a method for selecting a metal material, and a device for predicting a corrosion loss of a metal material.

BACKGROUND

As shown in Non Patent Literature 1, it is conventionally known that a corrosion loss of a metal material in an atmospheric corrosive environment is represented by Expression (1) below as an empirical expression.

$$Y=AX^B \quad (1)$$

In Expression (1), Y is a corrosion loss of a metal material, X is a use period of the metal material, A is a parameter indicating a corrosion loss of the metal material in an initial 1 year, and B is a parameter indicating attenuation of a corrosion rate by the effect of a rust layer formed by corrosion. The values of these parameters A and B change by the type of the metal material and the atmospheric corrosive environment. Thus, in predicting a long-term corrosion loss, a method is currently frequently being used that exposes a metal material to an atmospheric corrosive environment to be examined for a plurality of periods and extrapolates a temporal change in a corrosion loss with Expression (1).

By the way, the corrosion loss of the metal material is determined through action of the corrosion resistance of metal and atmospheric corrosive environmental factors such as temperature, relative humidity, time of wetness, rainfall amount, amount of airborne sea salt, and amount of $SO_2$ deposition in a complicated manner. Given these circumstances, techniques that predict the corrosion loss of the metal material through formulation using the environmental factors have been presented as described below.

Non Patent Literature 2 calculates the logarithm of a corrosion loss with the sum of a term multiple regressed with the logarithm of temperature, relative humidity, and airborne sea salt and a term multiple regressed with the logarithm of temperature, relative humidity, and $SO_2$ amount for carbon steel, zinc, copper, and aluminum, for example.

Patent Literature 1 represents a corrosion indicator Z as Expression (2) below with annual time of wetness, annually averaged wind velocity, amount of airborne sea salt, sulfur oxide amount, the activation energy of a corrosion reaction, and temperature as parameters and uses a quadratic function of this corrosion indicator Z for the calculation of a long-term corrosion loss.

$$Z = \alpha \cdot TOW \cdot \exp(-\kappa \cdot W) \cdot \frac{C+\delta \cdot S}{1+\varepsilon \cdot C \cdot S} \cdot \exp\left(\frac{-E_\alpha}{R \cdot T}\right) \quad (2)$$

In Expression (2), TOW is annual time of wetness (h), W is annually averaged wind velocity (m/s), C is amount of airborne sea salt (mdd), S is sulfur oxide amount (mdd), $E_\alpha$ is the activation energy (J/mol) of the corrosion reaction, R is the gas constant (J/(K·mol)), T is annually averaged temperature (K), and $\alpha$, $\kappa$, $\delta$, and $\varepsilon$ are constants. The above "mdd" is the amount of NaCl collected per unit number of days and unit area and is an abbreviation of "mg NaCl·$dm^{-2}$·$day^{-1}$."

Patent Literature 2 presents a technique that predicts an amount of airborne sea salt C. Patent Literature 3 presents a corrosion prediction technique that calculates the parameter A in Expression (1) known as an empirical expression by Expression (3) below with temperature, relative humidity, amount of airborne sea salt, and wetness probability as parameters and calculates the parameter B as a function of the parameter A by a laboratory experiment.

$$A=(\alpha \cdot T+\beta) \cdot Pw(T,H) \cdot (Sa^Y) \quad (3)$$

In Expression (3), T is temperature (° C.), H is relative humidity (%), Sa is amount of airborne sea salt (mg/$dm^2$/day (=mdd)), Pw (T, H) is wetness probability, and $\alpha$, $\beta$, $\gamma$ are coefficients set in accordance with a steel type.

Patent Literature 4 presents a corrosion prediction technique that calculates the parameter A in Expression (1) known as an empirical expression by Expression (4) below with temperature, time of wetness, and amount of airborne sea salt as parameters and sets the parameter B to be a range of 0.3 to 0.6 in an outdoor atmospheric corrosive environment.

$$A=kT^\alpha \cdot TOW^\beta \cdot Sa^Y \quad (4)$$

In Expression (4), T is temperature (° C.), TOW is time of wetness (h), Sa is amount of airborne sea salt (mg/$dm^2$/day (=mdd)), and $\alpha$, $\beta$, and $\gamma$ are coefficients.

Patent Literature 5 presents a technique that calculates the parameter A in Expression (1) known as an empirical expression by Expression (5) below and the parameter B by Expression (6) below when predicting a plate thickness reduction of a steel material in an atmospheric environment.

$$A=(CR0+CR1) \div 2 \quad (5)$$

$$B=2CR1 \div (CR0+CR1) \quad (6)$$

In Expression (5) and Expression (6), CR0 is a function representing an initial corrosion rate immediately after production of the steel material with environmental factors as parameters, whereas CR1 is a function representing a corrosion rate 1 year after production of the steel material with the environmental factors as parameters. The environmental factors in this example indicate annually averaged temperature (° C.), annually averaged humidity (%), annually averaged wind velocity (m/sec), amount of airborne sea salt (mg/$dm^2$/day (=mdd)), and sulfur oxide amount (mg/$dm^2$/day (=mdd)).

Patent Literature 6 presents a method that, when predicting a corrosion rate of a metal material, in performing multiple regression analysis with the corrosion rate as a response variable and with environmental factors and terrain factors having an influence on the corrosion rate as explanatory variables, includes virtual time of wetness with weighting performed in accordance with a relative humidity of 0% to 100% as at least one of the explanatory variables, determines this virtual time of wetness by summing multiplied values obtained by multiplying time corresponding to changing relative humidity by a weight coefficient varying in accordance with the changing relative humidity, and creates a corrosion rate estimation expression by multiple regression analysis based on the measured corrosion rate of the metal material.

Patent Literature 7 presents a deterioration prediction mapping device that optimizes a multiple regression expression in using multiple regression analysis for the prediction of deterioration of a metal material.

CITATION LIST

Patent Literature

Patent Literature 1: Japanese Patent No. 3909057
Patent Literature 2: Japanese Patent No. 4143018
Patent Literature 3: Japanese Patent No. 4706254
Patent Literature 4: Japanese Patent No. 5895522
Patent Literature 5: Japanese Patent No. 5066160
Patent Literature 6: Japanese Patent No. 5066955
Patent Literature 7: Japanese Patent No. 5684552
Non Patent Literature 1: "Joint research report on application of corrosion resisting steel to bridges (XVIII)," Institute of Civil Engineering of the Ministry of Construction, the Kozai Club, and Japan Bridge Association, March, 1993
Non Patent Literature 2: ISO 9223: 1992 "Corrosion of metals and alloys—Corrosivity of atmospheres—Classification, determination and estimation"

SUMMARY

Technical Problem

Patent Literature 1 to 5 evaluate the relation between the corrosion loss and the corrosion rate and the environmental parameters to select the environmental parameters to be employed as the explanatory variables and to perform formulation. However, the corrosion loss, the corrosion rate, and the environmental parameters have correlation in a complicated manner. The relation between the corrosion loss and temperature is nonlinear, whereas amount of airborne sea salt and amount of $SO_2$ deposition have a pseudocorrelation, for example. In such correlation, when formulation is performed as in Patent Literature 1 to 5, high-accuracy prediction is not expected.

Patent Literature 6 is characterized in that weighting is performed focusing on time of wetness. By thus performing weighting, accuracy increases, but even if weighting is performed only on time of wetness among the many environmental parameters, effective accuracy improvement is not expected. The method of Patent Literature 6 can perform corrosion prediction only in a period currently having data and cannot perform long-term corrosion prediction.

Patent Literature 7 improves prediction accuracy by selecting a plurality of environmental parameters out of many environmental parameters and repeatedly performing multiple regression to make the best expression, but the relation between the corrosion loss and the corrosion rate cannot simply be represented by a linear expression with the environmental parameters obtained by multiple regression. Consequently, significant accuracy improvement is not expected by the method of Patent Literature 7.

The present invention has been made in view of the above, and an object thereof is to provide a method for predicting a corrosion loss of a metal material, a method for selecting a metal material, and a device for predicting a corrosion loss of a metal material that can perform long-term corrosion prediction in an atmospheric corrosive environment with high accuracy.

Solution to Problem

To solve the problem and achieve the object, a method of predicting a corrosion loss of a metal material according to the present invention is a method of predicting a corrosion loss of a metal material using corrosion loss data that includes a use period of a metal material, environmental parameters indicating a use environment of the metal material in the use period, and a corrosion loss of the metal material in the use period. The method includes: a step of inputting a prediction request point including a use period of the metal material for which a corrosion loss is desired to be predicted and environmental parameters indicating a use environment of the metal material in the use period; a step of calculating a similarity degree between the environmental parameters in the corrosion loss data and the environmental parameters in the prediction request point; a step of dimensionally reducing the environmental parameters in the corrosion loss data to a latent variable taking the similarity degree into consideration; and a step of predicting a corrosion loss of the metal material for the prediction request point based on a prediction expression constructed using the latent variable and the similarity degree.

Moreover, in the method of predicting the corrosion loss of the metal material according to the present invention, the step of predicting the corrosion loss includes: a step of predicting a first parameter indicating a corrosion loss of the metal material in a predetermined period; a step of predicting a second parameter indicating attenuation of a corrosion rate of the metal material; and a step of predicting a corrosion loss of the metal material in a period longer than the predetermined period based on the use period of the metal material, the first parameter, and the second parameter.

Moreover, in the method of predicting the corrosion loss of the metal material according to the present invention, the step of predicting the first parameter predicts the corrosion loss of the metal material in the predetermined period under the environmental parameters of the prediction request point based on the prediction expression constructed using the latent variable and the similarity degree.

Moreover, in the method of predicting the corrosion loss of the metal material according to the present invention, the step of predicting the second parameter predicts the second parameter based on the use period of the metal material for which a corrosion loss is desired to be predicted, the environmental parameters in the corrosion loss data, and the similarity degree.

Moreover, in the method of predicting the corrosion loss of the metal material according to the present invention, the environmental parameters include at least one of temperature, relative humidity, absolute humidity, time of wetness, and rainfall amount and at least one of amount of airborne sea salt, amount of $SO_x$ deposition, and $NO_x$ concentration.

Moreover, in the method of predicting the corrosion loss of the metal material according to the present invention, the metal material is a steel material.

Moreover, a method of selecting a metal material according to the present invention is the method of selecting the metal material corresponding to a use environment using the method of predicting the corrosion loss of the metal material according to the present invention.

Moreover, a device for predicting corrosion loss of a metal material according to the present invention includes: a database configured to store corrosion loss data including: a use period of a metal material; environmental parameters indicating a use environment of the metal material in the use period; and a corrosion loss of the metal material in the use period; an input unit configured to input a prediction request point, the prediction request point including: a use period of the metal material for which a corrosion loss is desired to be predicted; and environmental parameters indicating a use environment of the metal material in the use period; a similarity degree calculation unit configured to calculate a similarity degree between the environmental parameters in the corrosion loss data and the environmental parameters in the prediction request point; a dimension reduction unit configured to dimensionally reduce the environmental parameters in the corrosion loss data to a latent variable taking the similarity degree into consideration; and a corrosion loss prediction unit configured to predict a corrosion loss of the metal material for the prediction request point based on a prediction expression constructed using the latent variable and the similarity degree.

Advantageous Effects of Invention

The present invention can perform long-term corrosion prediction of a metal material with high accuracy in an atmospheric corrosive environment and can select an optimum metal material corresponding to a use environment. The present invention can predict a corrosion loss of a metal material with high accuracy even in any region regardless of region.

DESCRIPTION OF EMBODIMENTS

The following describes a method for predicting a corrosion loss of a metal material, a method for selecting a metal material, and a device for predicting a corrosion loss of a metal material according to an embodiment of the present invention with reference to the accompanying drawings. The following embodiment does not limit the present invention.

The inventors of the present invention have conducted earnest studies to achieve the above object and have found out that prediction accuracy improves by separately predicting a parameter A (a first parameter) indicating a corrosion loss of a metal material in an initial 1 year in each atmospheric corrosive environment and a parameter B (a second parameter) indicating attenuation of a corrosion rate by a rust layer and, in the prediction, performing prediction from data with weighting performed on environmental parameters to complete the present invention.

A corrosion rate of a metal material generally attenuates with the lapse of time. This is caused by a protective effect by a corrosive product (a rust layer, for example) produced on the surface of the metal material. This protective effect significantly varies depending on an ambient environment and the type of the metal material. Thus, the corrosion rate of the metal material involves extremely many factors such as various environments and the corrosion resistance of the metal material. Consequently, it is extremely difficult to predict the corrosion loss of the metal material in a given environment and period with high accuracy from the rules and principles of the relation between the environmental parameters and the corrosion loss; it is realistic to perform prediction the corrosion loss of the metal material statistically from a data group of the corrosion loss and the environmental parameters accumulated in a database, for example, which also leads to accuracy improvement.

In general, not many pieces of long-term data are in the accumulated data group of the corrosion loss and the environmental parameters. For example, when the given period for which the corrosion loss is predicted is a long term as long as a few tens of years, when the period is incorporated into the prediction as a variable to directly predict the corrosion loss, the corrosion loss of the given long term is predicted from data of a remote period, thus degrading accuracy. Given these circumstances, the present invention separately predicts the parameter A indicating the corrosion loss of the metal material in the initial 1 year and the parameter B indicating attenuation of the corrosion rate by the rust layer to improve accuracy.

Figure 1:
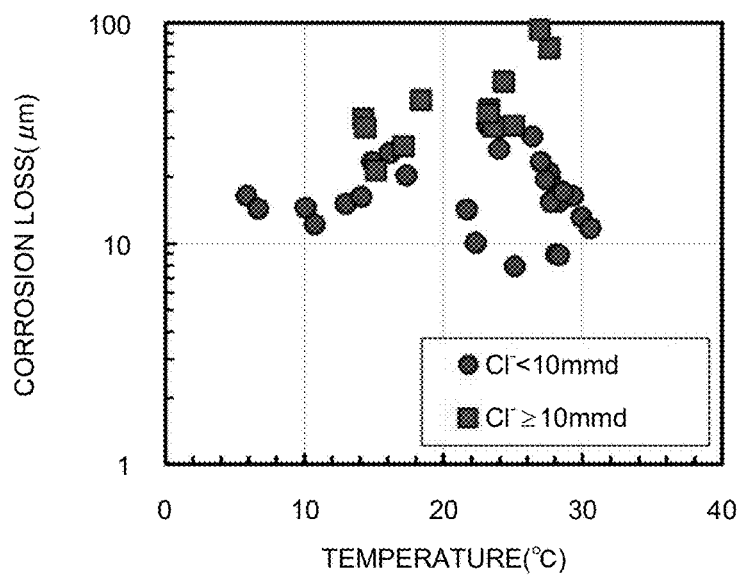
FIG. 1 is graph of a relation between temperature (annually averaged) and a corrosion loss (annual) in an atmospheric corrosive environment.
Figure 2:
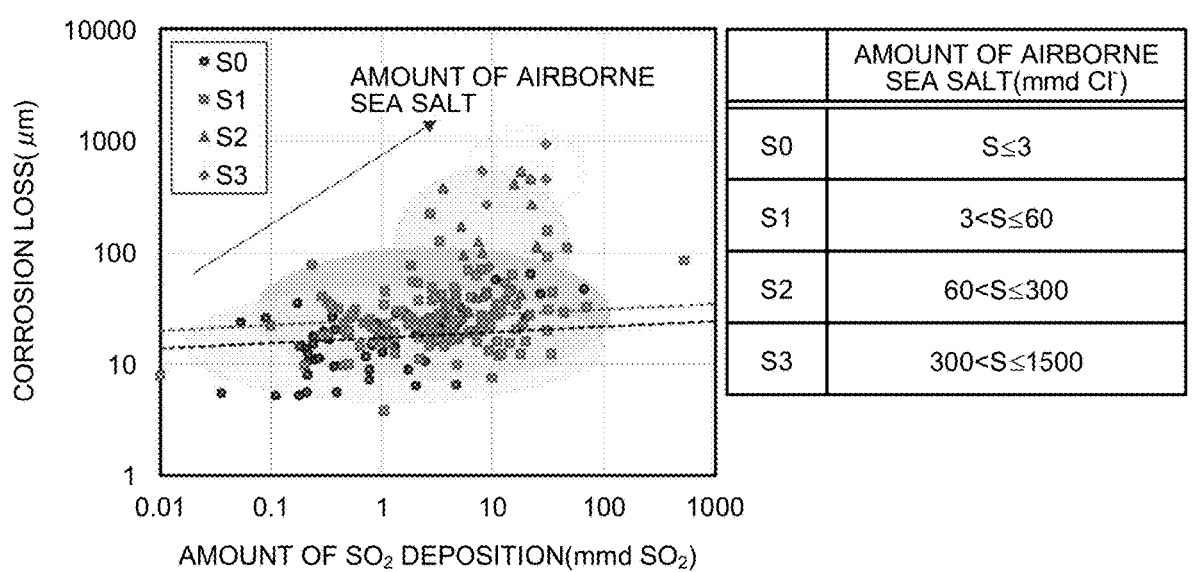
FIG. 2 is a graph of a pseudocorrelation between amount of $SO_2$ deposition (annually averaged) and amount of airborne sea salt (annually averaged) in the atmospheric corrosive environment.

Examples of main environmental parameters related to the corrosion loss of the metal material in the given period include temperature, relative humidity, absolute humidity, time of wetness, rainfall amount, amount of airborne sea salt, amount of $SO_X$ deposition, and $NO_X$ concentration. Among these environmental parameters, some have a nonlinear relation like the relation between temperature and the corrosion loss illustrated in FIG. 1, for example. Some environmental parameters have multicollinearity like the relation between amount of airborne sea salt and amount of $SO_2$ deposition illustrated in FIG. 2, for example. In addition to the fact that there are a plurality of environmental parameters having an influence on the corrosion of the metal material, these two points cause difficulty in predicting the corrosion loss of the metal material in the given environment and period with high accuracy.

For any environment parameter having a nonlinear relation with the corrosion loss, weighting is performed on each sample by similarity with a given environment and period for which prediction is desired to be performed, and multiple regression analysis is locally performed, whereby prediction accuracy can be improved. The "sample" means the data group of the corrosion loss and the environmental parameters stored in the database (corrosion loss data described below).

The fact that the environmental parameters have multicollinearity can be dissolved by performing dimensional reduction to a parameter having independency to the environmental parameters to create a new parameter. "Locally weighted partial least squares (L-PLS)" shown in Reference Literature 1 below is a method that simultaneously achieves these points.

Reference Literature 1: Kim Sanghong, Okajima Ryota, Kano Manabu, and Hasebe Shinji, "Sample selection to construct accurate locally weighted PLS models," 54th Automatic Control Joint Lecture Meeting, 54(2011), p. 1594

The present invention uses a method that determines similarity (a similarity degree) of the parameter A indicating the corrosion loss of the metal material in the initial 1 year in each atmospheric corrosive environment and the parameter B indicating attenuation of the corrosion rate by the rust layer with a prediction request point for each sample, performs weighting using the similarity degree, and performs local regression to perform prediction. The environmental parameters are dimensionally reduced to create a new parameter (derivation of a latent variable), which serves as an explanatory variable of local regression. In that process, the latent variable is determined such that the inner product of the latent variable using the weighting using the similarity degree and a response variable is maximized to perform local multiple regression. The following describes a specific embodiment of the present invention with reference to the accompanying drawings.

(Device for Predicting Corrosion Loss)

Figure 3:
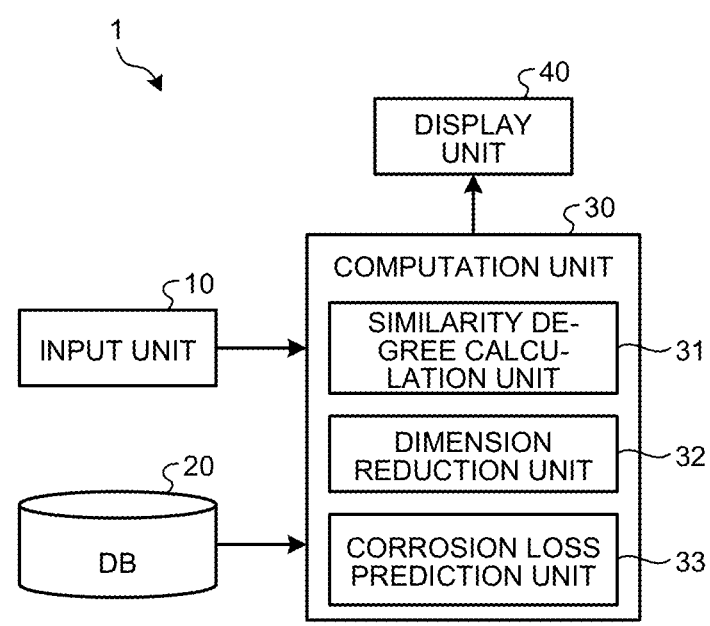
FIG. 3 is a block diagram of a configuration of a device for predicting a corrosion loss of a metal material according to an embodiment of the present invention.

The following describes a configuration of the device for predicting a corrosion loss of a metal material according to the embodiment of the present invention with reference to FIG. 3. This device 1 for predicting a corrosion loss includes an input unit 10, a database 20, a computation unit 30, and a display unit 40.

The input unit 10 is implemented by an input device such as a keyboard, a mouse pointer, or a numeric keypad. As described below, the prediction request point described below is input to the computation unit 30 via this input unit 10.

The database 20 stores therein the corrosion loss data as actual values of the corrosion loss of the metal material. The corrosion loss data includes a use period of the metal material (a steel material, for example), the corrosion loss of the metal material in the use period, and a plurality of annually averaged environmental parameters in a use environment of the metal material. "The environmental parameters" include at least one of temperature (atmospheric temperature), relative humidity, absolute humidity, time of wetness, and rainfall amount and at least one of amount of airborne sea salt, amount of $SO_x$ deposition, and $NO_X$ concentration. These environmental parameters are annually averaged data, for example. In addition, the database 20 stores therein the corrosion loss data for each steel type.

The computation unit 30 is implemented by a central processing unit (CPU), for example, and includes a similarity degree calculation unit 31, a dimension reduction unit 32, and a corrosion loss prediction unit 33. The details of the similarity degree calculation unit 31, the dimension reduction unit 32, and the corrosion loss prediction unit 33 will be described below.

The display unit 40 is implemented by a display device such as a liquid crystal display (LCD) or a cathode ray tube (CRT) display and displays a prediction result of the corrosion loss of the metal material based on display signals input from the computation unit 30.

(Method for Predicting Corrosion Loss)

Figure 4:
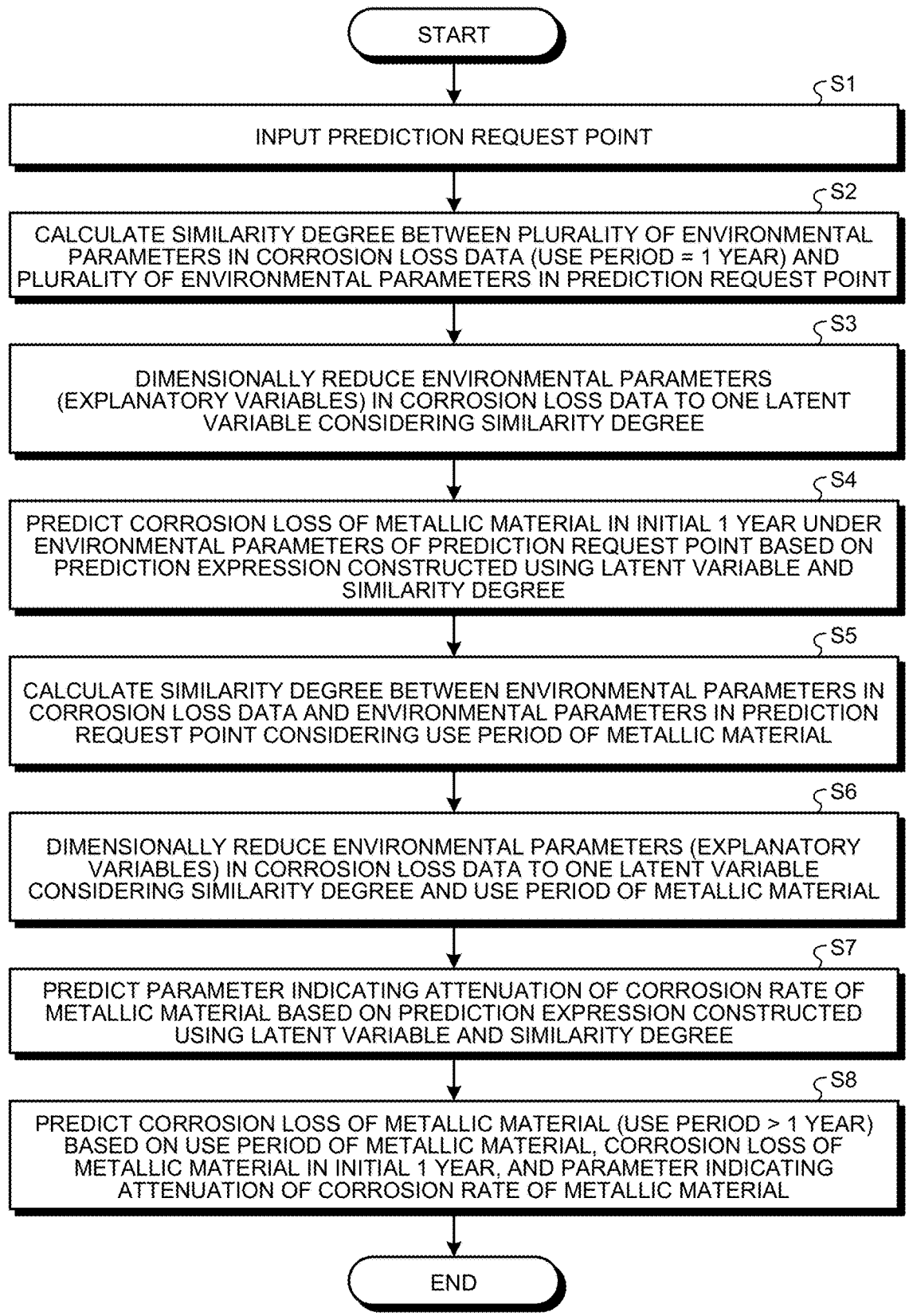
FIG. 4 is a flowchart of a procedure of a method for predicting a corrosion loss of a metal material according to the embodiment of the present invention.

The following describes the method for predicting a corrosion loss of a metal material according to the embodiment of the present invention with reference to FIG. 4. The method for predicting a corrosion loss performs a prediction request point input step, a first similarity degree calculation step, a first dimension reduction step, an initial corrosion loss prediction step (a first parameter prediction step), a second similarity degree calculation step, a second dimension reduction step, an attenuation prediction step (a second parameter prediction step), and a long-term corrosion loss prediction step.

At the prediction request point input step, the prediction request point is input to the computation unit 30 via the input unit 10 (Step S1). This prediction request point includes a use period of a metal material for which a corrosion loss is desired to be predicted and a plurality of annually averaged environmental parameters indicating a use environment of the metal material in this use period.

Subsequently, at the first similarity degree calculation step, the similarity degree calculation unit 31 calculates a similarity degree between a plurality of environmental parameters in the corrosion loss data of the metal material the use period of which is 1 year stored in the database 20 and a plurality of environmental parameters in the prediction request point (Step S2). At the present step, the similarity degree calculation unit 31 calculates the similarity degree by Expression (8) described below, for example. Specific examples of the present step will be described in examples described below.

Subsequently, at the first dimension reduction step, the dimension reduction unit 32 dimensionally reduces the environmental parameters (explanatory variables) in the carrion amount data to a latent variable considering the similarity degree calculated at the first similarity degree calculation step (Step S3). At the present step, the dimension reduction unit 32 calculates the latent variable by Expression (7) described below, for example. Specific examples of the present step will be described in the examples described below.

Subsequently, at the initial corrosion loss prediction step, the corrosion loss prediction unit 33 predicts a corrosion loss of the metal material in an initial 1 year under the environmental parameters of the prediction request point based on a prediction expression constructed using the latent variable calculated at the first dimension reduction step and the similarity calculated at the first similarity degree calculation step (Step S4). This corrosion loss of the metal material in the initial 1 year means the parameter A (the first parameter) in Expression (1). At the present step, the corrosion loss prediction unit 33 constructs a prediction expression shown in Expression (10) described below, for example, and predicts the corrosion loss of the metal material in the initial 1 year based on this prediction expression. Specific examples of the present step will be described in the examples described below.

Subsequently, at the second similarity degree calculation step, the similarity degree calculation unit 31 calculates a similarity degree between the environmental parameters in the corrosion loss data of the metal material and the environmental parameters in the prediction request point considering the use period of the metal material for which the corrosion loss is desired to be predicted (Step S5). At the present step, the similarity degree calculation unit 31 calculates the similarity degree by Expression (13) described below, for example. A specific example of the present step will be described in an example described below.

Subsequently, at the second dimension reduction step, the dimension reduction unit 32 dimensionally reduces the environmental parameters (explanatory variables) in the corrosion loss data to a latent variable considering the similarity degree calculated at the second similarity degree calculation step and the use period of the metal material for which the corrosion loss is desired to be predicted (Step S6).

At the present step, the dimension reduction unit 32 calculates the latent variable by Expression (12) described below, for example. A specific example of the present step will be described in an example described below.

Subsequently, at the attenuation prediction step, the corrosion loss prediction unit 33 predicts a parameter indicating attenuation of the corrosion rate of metal material based on a prediction expression constructed using the latent variable calculated at the second dimension reduction step and the similarity degree calculated at the second similarity degree calculation step (Step S7). This parameter indicating attenuation of the corrosion rate of the metal material means the parameter B (the second parameter) in Expression (1). At the present step, the corrosion loss prediction unit 33 constructs a prediction expression shown in Expression (16) described below, for example, and predicts the parameter indicating attenuation of the corrosion rate of the metal material based on this prediction expression. A specific example of the present step will be described in an example described below.

Subsequently, at the long-term corrosion loss prediction step, a corrosion loss of the metal material in a period longer than 1 year (a long-term corrosion loss) is predicted based on the use period of the metal material, the parameter A calculated at the initial corrosion loss prediction step and the parameter B calculated at the attenuation prediction step (Step S8). At the present step, the corrosion loss prediction unit 33 predicts the long-term corrosion loss based on Expression (1). A specific example of the present step will be described in an example described below.

As in the foregoing, the method for predicting a corrosion loss of a metal material using the device 1 for predicting a corrosion loss according to the present embodiment can perform long-term corrosion prediction of a metal material with high accuracy in an atmospheric corrosive environment and can select an optimum metal material corresponding to a use environment.

When the environmental parameters employed as the explanatory variables are selected to perform formulation as in conventional technologies such as Patent Literature 1 to 5, prediction accuracy varies by region for which the corrosion loss is to be predicted such as being high in prediction accuracy in one region and being low in prediction accuracy in another region. In contrast, according to the method for predicting corrosion loss of a metal material according to the present embodiment can perform prediction if there is corrosion loss data similar to that of a region for which the corrosion loss is to be predicted in the database 20, and thus the corrosion loss of the metal material can be predicted with high accuracy even in any region.

EXAMPLES

Example 1

The following describes the present invention in more detail with reference to an example. In the present example, an annual corrosion loss (a corrosion loss in an initial 1 year) of carbon steel in a rain falling environment was predicted. The contents of the present example correspond to the prediction request point input step, the first similarity degree calculation step, the first dimension reduction step, and the initial corrosion loss prediction step out of the method for predicting a corrosion loss described above.

In the present example, using a data group of annual corrosion losses of the carbon steel in worldwide 70 regions and annually averaged environment parameters (the corrosion loss data) stored in the database, an annual corrosion loss was predicted. Prediction accuracy was validated using cross-validation by a comparison of relative root means square of error (rRMSE). As a comparative example, an annual corrosion loss was predicted using "dose-response function" shown in ISO 9223 of Non Patent Literature 1.

"Dose-response function" is an expression calculating a corrosion loss from four environmental parameters of temperature (° C.), relative humidity (%), amount of airborne sea salt (mmd (in terms of Cl$^-$)), and amount of SO$_2$ deposition (mmd (in terms of SO$_2$)). The above "mmd" is the amount of Cl$^-$ or SO$_2$ collected per unit number of days and unit area and is an abbreviation of "mg·m$^{-2}$·day$^{-1}$." Similar four environmental parameters were also used in the prediction of the present inventive example. As described above, it is known that when the explanatory variables have correlation, prediction accuracy degrades due to multicollinearity. In L-PLS described above, the environmental parameters used as the explanatory variables have correlation, and thus the correlation is excluded by dimension reduction to create the new parameter (the latent variable). L-PLS performs calculation in accordance with a procedure shown in Reference Literature 1 described above. An expression for reducing the four environmental parameters to the latent variable (a parameter t) can be shown as Expression (7) below.

$$t = w_1 T + w_2 RH + w_3 Cl + w_4 SO2 \quad (7)$$

In Expression 7, T is temperature (° C.), RH is relative humidity (%), Cl is an amount of airborne sea salt (mg/m$^2$/day (=mmd) (in terms of Cl$^-$)), SO$_2$ is an amount of SO$_2$ deposition (mg/m$^2$/day (=mmd) (in terms of SO$_2$)), and $w_1$ to $w_4$ are coefficients. While Expression 7 includes only four environmental parameters as an example, actually, it is preferable to include all environmental parameters that are predicted to relate to corrosion in a region for which the corrosion loss is to be predicted.

In the present inventive example, first, the prediction request point including a use period of the carbon steel for which the corrosion loss is desired to be predicted and a plurality of annually averaged environmental parameters indicating a use environment of the carbon steel in this use period was input to the computation unit of the device for predicting a corrosion loss ("the prediction request point input step" in FIG. 4).

Subsequently, a similarity degree $\omega_i$ between the environmental parameters of the prediction request point for which the corrosion loss is desired to be predicted and environmental parameters i of the corrosion loss data referred to for the prediction of the corrosion loss was calculated using a Euclidean distance shown in Expression (8) below ("the first similarity degree calculation step" in FIG. 4). The environmental parameters vary in the spread of data, and thus the values were normalized.

$$\omega_i = \exp\left(-\frac{\sqrt{(T_q - T_i)^2 + (RH_q - RH_i)^2 + (Cl_q - Cl_i)^2 + (SO2_q - SO2_i)^2}}{\sigma \varphi}\right) \quad (8)$$

Where $\omega_i$ is a localization parameter, the environmental parameters with a lower-right suffix of q are the environmental parameters of the prediction request point for which the corrosion loss is desired to be predicted, the environmental parameters with a lower right suffix of i are the environmental parameters of the corrosion loss data referred to from the database, and σ is a standard deviation of Expression (9) below. The letter φ is an adjustment parameter; the value is determined by being adjusted as appropriate based on φ=1, for example.

$$\sqrt{(T_q - T_i)^2 + (RH_q - RH_i)^2 + (Cl_q - Cl_i)^2 + (SO2_q - SO2_i)^2} \quad (9)$$
$$(i = 1, 2, \ldots, N)$$

Subsequently, from the similarity degree $\omega_i$ calculated by Expression (8), the environmental parameters of the corrosion loss data, and the corrosion loss, in accordance with a procedure shown in (Chapter 2.1) of Reference Literature 1, the coefficients $w_1$ to $w_4$ in Expression (7) were determined such that the inner product of the latent variable multiplied by the similarity degree $\omega_i$ as weight and the response variable (the corrosion loss) was maximized. Using the determined coefficients $w_1$ to $w_4$, the latent variable of the environmental parameters was calculated by Expression (7) ("the first dimension reduction step" in FIG. 4).

Subsequently, a prediction expression of the corrosion loss shown in Expression (10) below was constructed by local regression, and an annual corrosion loss of the carbon steel (the corrosion loss in the initial 1 year) under the environmental parameters of the prediction request point was predicted based on Expression (10) below ("the initial corrosion loss prediction step" in FIG. 4)

$$Y = \alpha t \quad (10)$$

Where Y is a predicted value of the corrosion loss, and α is a coefficient (a regression coefficient). While being omitted in Expression (10), Expression (10) can include a constant term or include a plurality of latent variables.

Thus, the present inventive example performs calculation of the similarity degree between the prediction request point and each corrosion loss data, calculation of the coefficients of the latent variable, and construction of the prediction expression each time the prediction request point for which the corrosion loss is desired to be predicted is input.

Figure 5:
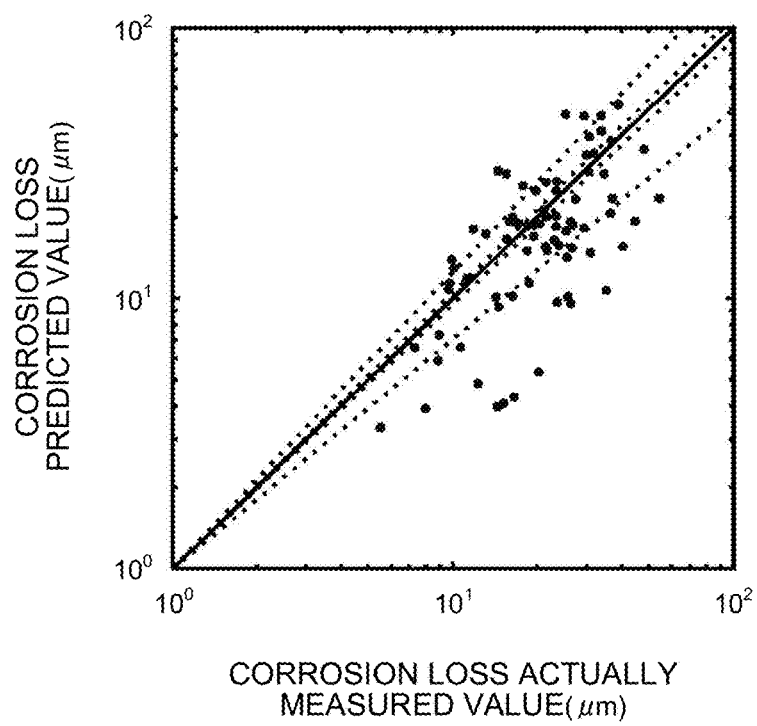
FIG. 5 is a graph of an error between a corrosion loss predicted value and a corrosion loss actually measured value of a metal material after 1 year obtained by the method for predicting a corrosion loss of a metal material according to a conventional technique.
Figure 6:
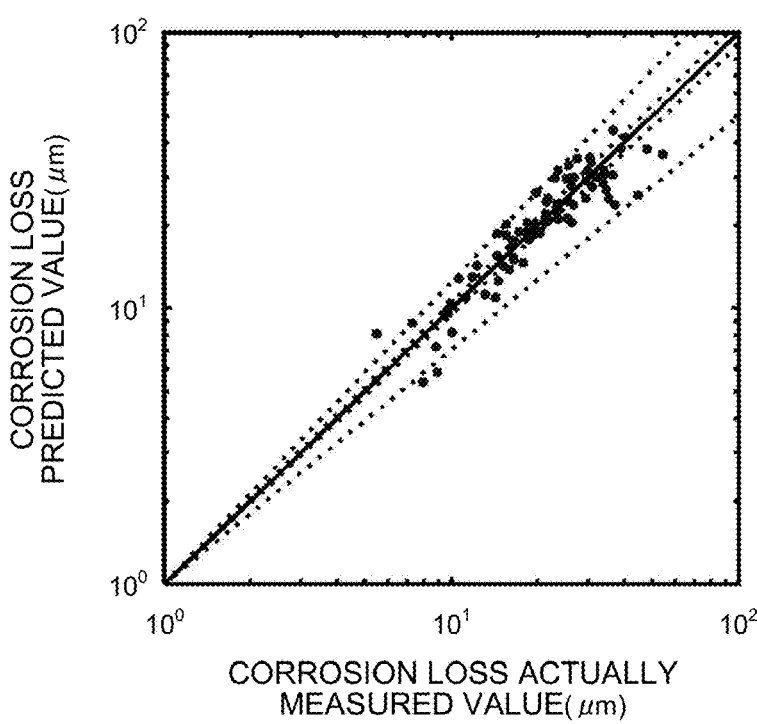
FIG. 6 is a graph of an error between the corrosion loss predicted value and the corrosion loss actually measured value of the metal material after 1 year obtained by the method for predicting a corrosion loss of a metal material according to the embodiment of the present invention.

FIG. 5 illustrates a prediction result of the corrosion loss by the comparative example (dose-response function), whereas FIG. 6 illustrates a prediction result of the corrosion loss by the present inventive example. As illustrated in the drawings, rRMSE was 0.40 for the comparative example, whereas rRMSE was 0.18 for the present inventive example. Consequently, the method of the present invention was used, whereby a prediction error of the corrosion loss was able to be improved to a half or less of that of the conventional method.

Example 2

In the present example, a long-term (9-year) corrosion loss of carbon steel in an environment under the eaves was predicted. The contents of the present example correspond to all the steps of the method for predicting a corrosion loss described above.

In the present example, using a data group of corrosion losses of worldwide 55 regions in 1 year, the 55 regions in 3 years, 39 regions in 5 years, 38 regions in 7 years, and the 38 regions in 9 years and annually averaged environment parameters (the corrosion loss data) stored in the database for the environment under the eaves, the parameter A (refer to Expression (1)) indicating the corrosion loss in the initial 1 year was calculated for a JIS corrosion resisting steel by a method similar to that of Example 1 (the prediction request input step, the first similarity degree calculation step, the first dimension reduction step, and the initial corrosion loss prediction step in FIG. 4).

Subsequently, weighting was performed on a 7-year long-term corrosion test result, the parameter B indicating attenuation of the corrosion rate by the rust layer was calculated, and the corrosion loss of the JIS corrosion resisting steel after 9 years was predicted by Expression (1). In the prediction of the corrosion loss after 9 years, first, Expression (1) was transformed as shown in Expression (11) below, and then a difference between the logarithm of the corrosion loss in the initial 1 year and the logarithm of the corrosion loss after 9 years on the left side was calculated using the parameter B and the use period X.

$$\log Y - \log A = B \log X \quad (11)$$

For the prediction of the left side of Expression (11), L-PLS is used. Specifically, four environmental parameters are multiplied by the logarithm of the use period X to create new environmental parameters considering a time factor, and these new environmental parameters are reduced to a latent variable (a parameter u) as shown in Expression (12) below.

$$u = (v_1 T + v_2 RH + v_3 Cl + v_4 SO2) \log X \quad (12)$$

In Expression (12), T is temperature (° C.), RH is relative humidity (%), Cl is an amount of airborne sea salt (mg/m²/day (=mmd) (in terms of Cl⁻)), $SO_2$ is an amount of $SO_2$ deposition (mg/m²/day (=mmd) (in terms of $SO_2$)), and $v_1$ to $v_4$ are coefficients.

Subsequently, a similarity degree $\omega_i$ between the environmental parameters of the prediction request point for which the corrosion loss is desired to be predicted and environmental parameters i of the corrosion loss data referred to for the prediction of the corrosion loss was calculated using a Euclidean distance shown in Expression (13) below ("the second similarity degree calculation step" in FIG. 4). The environmental parameters vary in the spread of data, and thus the values were normalized.

$$\omega_i = \exp\left(-\frac{\sqrt{(T_q \log X_q - T_i \log X_i)^2 + (RH_q \log X_q - RH_i \log X_i)^2 + (Cl_q \log X_q - Cl_i \log X_i)^2 + (SO2_q \log X_q - SO2_i \log X_i)^2}}{\sigma \varphi}\right) \quad (13)$$

Where $\omega_i$ is a localization parameter, the environmental parameters with a lower-right suffix of q are the environmental parameters of the prediction request point for which the corrosion loss is desired to be predicted, the environmental parameters with a lower right suffix of i are the environmental parameters of the corrosion loss data referred to from the database, and σ is a standard deviation of Expression (14) below. The letter φ is an adjustment parameter; the value is determined by being adjusted as appropriate based on φ=1, for example.

$$\sqrt{(T_q \log X_q - T_i \log X_i)^2 + (RH_q \log X_q - RH_i \log X_i)^2 + (Cl_q \log X_q - Cl_i \log X_i)^2 + (SO2_q \log X_q - SO2_i \log X_i)^2} \quad (14)$$
$$(i = 1, 2, \ldots, N)$$

Subsequently, from the similarity degree $\omega_i$, calculated by Expression (13), the environmental parameters of the corrosion loss data, and the corrosion loss, in accordance with the procedure shown in (Chapter 2.1) of Reference Literature 1, the coefficients $v_1$ to $v_4$ in Expression (12) were determined such that the inner product of the latent variable multiplied by the similarity degree $\omega_i$ as weight and the response variable (the corrosion loss) was maximized. Using the determined coefficients $v_1$ to $v_4$, the latent variable of the environmental parameters was calculated by Expression (12) ("the second dimension reduction step" in FIG. 4).

Subsequently, a prediction expression of the corrosion loss shown in Expression (15) below was constructed by local regression, and a difference of the logarithm of the corrosion loss in an environmental parameter desired to be predicted was calculated.

$$\log Y - \log A = \beta u \qquad (15)$$

In Expression (15), β is a coefficient (a regression coefficient). While being omitted in Expression (15), Expression (15) can include a constant term or include a plurality of latent variables.

Thus, the present inventive example performs calculation of the similarity degree between the prediction request point and each piece of corrosion loss data, calculation of the coefficients of the latent variable, and construction of the prediction expression each time the prediction request point for which the corrosion loss is desired to be predicted is input.

Subsequently, the parameter B in Expression (11) was calculated by Expression (16) below based on Expression (12) and Expression (15) ("the attenuation prediction step" in FIG. 4).

$$B = \frac{\beta u}{\log X} = \beta(v_1 T_q + v_2 RH_q + v_3 Cl_q + v_4 SO2_q) \qquad (16)$$

Subsequently, a corrosion loss Y after 9 years was calculated by Expression (1) using the calculated parameter A and parameter B (the long-term corrosion loss prediction step in FIG. 4). Then, like Example 1, prediction accuracy was validated using cross-validation by a comparison of relative root means square of error (rRMSE).

Figure 7:
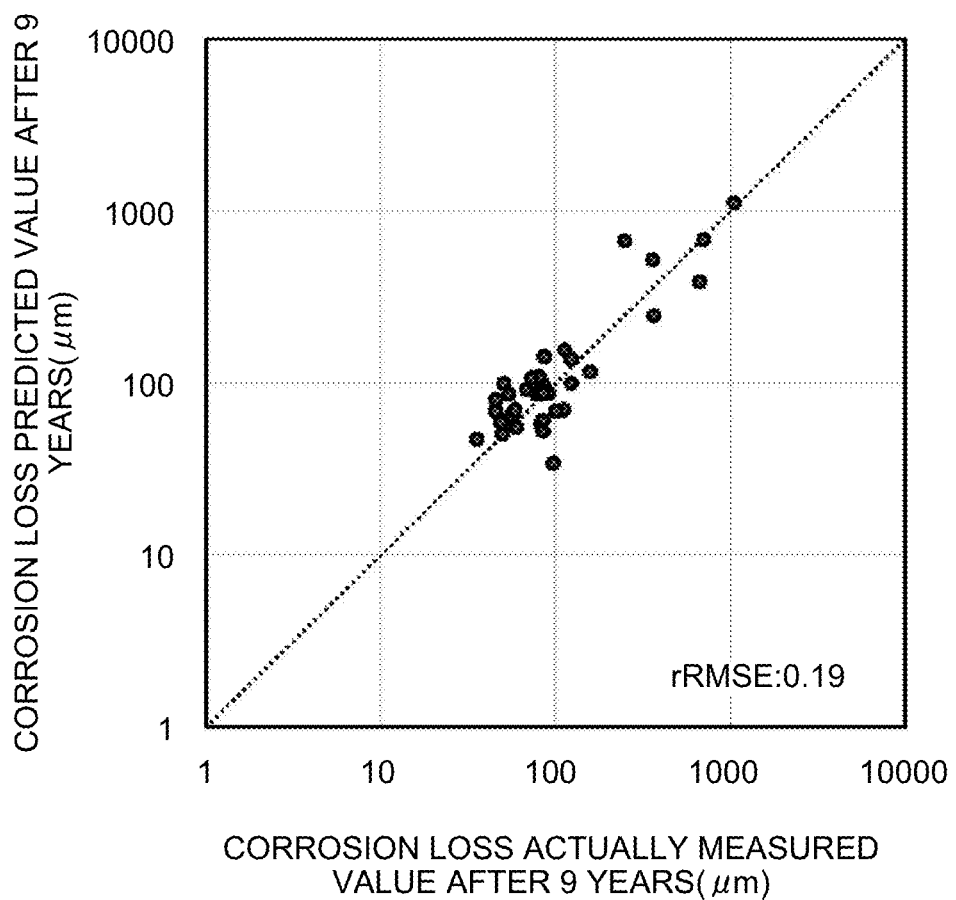
FIG. 7 is a graph of an error between the corrosion loss predicted value and the corrosion loss actually measured value of the metal material after 9 years obtained by the method for predicting a corrosion loss of a metal material according to the embodiment of the present invention.

FIG. 7 illustrates a prediction result of the corrosion loss by the present inventive example. As illustrated in this drawing, in the present inventive example, the long-term corrosion loss in as long as 9 years also had an error (rRMSE: 0.19) comparative to that of Example 1, thus enabling high-accuracy prediction. While accuracy validation is impossible, it is possible to predict, by using the present inventive example, the long-term corrosion loss that is not stored in the database. For reference, Table 1 lists predicted values of the corrosion loss after 50 years together with the environmental parameters.

TABLE 1

| Region (No.) | Temperature (° C.) | Relative humidity (%) | Amount of airborne sea salt (mmd CL⁻) | Amount of SO₂ deposition (mmd SO₂) | A value | B value | Corrosion loss actually measured value after 9 years (μm) | Corrosion loss predicted value after 9 years (μm) | Corrosion loss predicted value after 50 years (μm) |
|---|---|---|---|---|---|---|---|---|---|
| 1 | 28.6 | 75.1 | 1.06 | 2.60 | 10.54 | 0.462 | — | 29.1 | 0.064 |
| 2 | 27.8 | 78.2 | 2.45 | 6.60 | 14.16 | 0.852 | — | 92.1 | 0.397 |
| 3 | 28.3 | 78.4 | 0.54 | 1.00 | 8.00 | 0.483 | — | 23.1 | 0.053 |
| 4 | 29.2 | 70.8 | 0.55 | 1.00 | 6.70 | 0.362 | — | 14.8 | 0.028 |
| 5 | 27.8 | 75.1 | 0.18 | 1.40 | 7.38 | 0.704 | — | 34.7 | 0.116 |
| 6 | 27.6 | 78.1 | 0.40 | 1.70 | 9.04 | 0.529 | — | 28.9 | 0.072 |
| 7 | 28.6 | 75.1 | 1.06 | 2.60 | 10.54 | 0.462 | — | 29.1 | 0.064 |
| 8 | 28.3 | 78.4 | 0.54 | 1.00 | 8.00 | 0.483 | — | 23.1 | 0.053 |
| 9 | 27.8 | 78.2 | 2.45 | 6.60 | 14.16 | 0.852 | — | 92.1 | 0.397 |
| 10 | 29.2 | 70.8 | 0.55 | 1.00 | 6.70 | 0.362 | — | 14.8 | 0.028 |
| 11 | 29.0 | 76.5 | 1.27 | 9.50 | 12.76 | 0.779 | — | 70.6 | 0.268 |
| 12 | 27.8 | 75.1 | 0.18 | 1.40 | 7.38 | 0.704 | — | 34.7 | 0.116 |
| 13 | 25.9 | 83.6 | 0.42 | 4.10 | 12.27 | 0.555 | — | 41.5 | 0.107 |
| 14 | 27.8 | 79.0 | 0.62 | 2.20 | 9.90 | 0.504 | — | 29.9 | 0.071 |
| 15 | 25.9 | 83.6 | 0.42 | 4.10 | 12.27 | 0.555 | — | 41.5 | 0.107 |
| 16 | 24.5 | 85.2 | 0.84 | 3.30 | 15.02 | 0.586 | — | 54.4 | 0.148 |
| 17 | 24.6 | 84.5 | 5.20 | 4.50 | 32.40 | 0.913 | — | 241.1 | 1.154 |
| 18 | 15.1 | 68.9 | 0.15 | 1.80 | 9.47 | 0.760 | 50.0 | 50.3 | 0.185 |
| 19 | 11.7 | 71.5 | 0.39 | 0.20 | 9.76 | 0.717 | 36.0 | 47.2 | 0.161 |
| 20 | 12.9 | 76.9 | 0.55 | 2.30 | 13.00 | 0.754 | 46.0 | 68.2 | 0.249 |
| 21 | 13.6 | 73.0 | 0.67 | 2.70 | 12.73 | 0.741 | 56.0 | 64.8 | 0.231 |
| 22 | 15.3 | 72.4 | 0.73 | 1.30 | 11.75 | 0.725 | 82.0 | 57.8 | 0.200 |
| 23 | 10.6 | 77.0 | 0.79 | 3.00 | 11.02 | 0.929 | 54.0 | 84.8 | 0.417 |
| 24 | 15.1 | 67.3 | 0.82 | 6.70 | 13.30 | 0.681 | 51.0 | 59.4 | 0.191 |
| 25 | 8.3 | 70.7 | 0.88 | 7.90 | 7.81 | 0.864 | 85.0 | 52.1 | 0.229 |
| 26 | 15.4 | 76.3 | 0.94 | 1.50 | 13.41 | 0.710 | 57.0 | 63.7 | 0.215 |
| 27 | 14.6 | 68.0 | 0.94 | 26.80 | 14.40 | 0.777 | 46.0 | 79.4 | 0.301 |
| 28 | 14.9 | 74.1 | 1.03 | 11.80 | 12.45 | 0.783 | 59.0 | 69.5 | 0.266 |
| 29 | 15.5 | 63.7 | 1.09 | 7.10 | 13.94 | 0.667 | 85.0 | 60.3 | 0.189 |
| 30 | 14.7 | 66.7 | 1.21 | 3.60 | 12.26 | 0.685 | 60.0 | 55.2 | 0.179 |
| 31 | 8.3 | 70.7 | 1.27 | 0.00 | 14.99 | 0.820 | 69.0 | 90.9 | 0.371 |
| 32 | 14.7 | 73.6 | 1.30 | 1.00 | 15.79 | 0.599 | 49.0 | 58.9 | 0.164 |
| 33 | 11.6 | 71.5 | 1.73 | 2.60 | 16.16 | 0.755 | 78.0 | 85.0 | 0.310 |
| 34 | 14.0 | 65.3 | 2.40 | 5.20 | 20.96 | 0.637 | 82.0 | 85.0 | 0.253 |
| 35 | 14.4 | 72.1 | 2.49 | 10.90 | 19.45 | 0.740 | 51.0 | 98.9 | 0.352 |
| 36 | 13.5 | 73.7 | 2.52 | 6.30 | 18.64 | 0.750 | 85.0 | 96.9 | 0.351 |
| 37 | 14.4 | 71.4 | 3.19 | 24.20 | 15.94 | 0.789 | 83.0 | 90.2 | 0.349 |
| 38 | 22.4 | 75.7 | 3.43 | 0.20 | 27.46 | 0.527 | 92.0 | 87.3 | 0.215 |

TABLE 1-continued

| Region (No.) | Temperature (° C.) | Relative humidity (%) | Amount of airborne sea salt (mmd CL⁻) | Amount of SO₂ deposition (mmd SO₂) | A value | B value | Corrosion loss actually measured value after 9 years (μm) | Corrosion loss predicted value after 9 years (μm) | Corrosion loss predicted value after 50 years (μm) |
|---|---|---|---|---|---|---|---|---|---|
| 39 | 22.4 | 75.7 | 3.88 | 0.40 | 26.42 | 0.641 | 81.0 | 107.9 | 0.324 |
| 40 | 7.9 | 75.8 | 4.49 | 3.60 | 26.08 | 0.759 | 123.0 | 138.3 | 0.509 |
| 41 | 15.8 | 64.8 | 4.61 | 24.50 | 14.26 | 0.824 | 85.0 | 87.1 | 0.357 |
| 42 | 16.1 | 70.2 | 4.82 | 3.20 | 32.69 | 0.538 | 73.0 | 106.7 | 0.269 |
| 43 | 11.7 | 76.6 | 5.07 | 0.50 | 20.93 | 0.708 | 123.0 | 99.1 | 0.334 |
| 44 | 14.6 | 70.6 | 5.61 | 14.00 | 30.26 | 0.744 | 114.0 | 155.2 | 0.556 |
| 45 | 13.1 | 73.5 | 5.43 | 5.00 | 34.03 | 0.650 | 87.0 | 142.0 | 0.433 |
| 46 | 10.8 | 79.2 | 0.73 | 0.30 | 13.04 | 0.758 | 111.0 | 69.0 | 0.253 |
| 47 | 13.8 | 63.8 | 0.27 | 0.10 | 8.99 | 0.607 | 98.0 | 34.1 | 0.097 |
| 48 | 14.4 | 71.4 | 1.24 | 7.10 | 13.09 | 0.752 | 101.0 | 68.4 | 0.248 |
| 49 | 16.4 | 67.0 | 4.73 | 9.90 | 17.21 | 0.871 | 158.0 | 116.7 | 0.520 |
| 50 | 16.8 | 73.8 | 10.77 | 3.60 | 44.64 | 0.982 | 671.0 | 386.0 | 2.079 |
| 51 | 21.6 | 77.0 | 10.98 | 5.90 | 54.52 | 1.027 | 363.0 | 521.2 | 3.035 |
| 52 | 8.3 | 70.7 | 12.02 | 6.70 | 43.78 | 0.779 | 366.0 | 242.7 | 0.923 |
| 53 | 15.9 | 67.6 | 14.02 | 3.30 | 93.33 | 0.897 | 248.0 | 670.0 | 3.120 |
| 54 | 13.3 | 75.0 | 20.66 | 2.30 | 77.94 | 0.989 | 709.0 | 684.7 | 3.733 |
| 55 | 14.1 | 73.8 | 51.95 | 2.80 | 126.50 | 0.989 | 1052.0 | 1110.1 | 6.047 |

Example 3

In Example 3, long-term corrosion losses of steel materials were predicted by the present invention, and then an optimum steel material in a bridge field was selected in view of the long-term corrosion loss and cost.

Table 2 lists environmental parameters (temperature, relative humidity, amount of airborne sea salt, and amount of SO₂ deposition) of regions 1 to 3 in which the steel materials are used. In the environments listed in Table 2, for a JIS corrosion resisting steel prescribed in "JIS G 3114" and steel types A and B, each having chemical components listed in Table 3, a corrosion loss after 50 years was predicted using the present invention. This period "50 years" is based on the prescription that the standard of an allowed corrosion loss for bridges is "0.3 mm or less after 50 years."

TABLE 2

| Region | Temperature (° C.) | Relative humidity (%) | Amount of airborne sea salt (mmd Cl⁻) | SO₂ amount (mmd SO₂) |
|---|---|---|---|---|
| 1 | 27.8 | 78.2 | 2.45 | 6.6 |
| 2 | 7.9 | 75.8 | 4.49 | 3.6 |
| 3 | 16.8 | 73.8 | 10.77 | 3.6 |

TABLE 3

| Type | C (% by mass) | Si (% by mass) | Mn (% by mass) | P (% by mass) | S (% by mass) | Al (% by mass) | Cu (% by mass) | Ni (% by mass) | Cr (% by mass) | Mo (% by mass) | N (% by mass) | O (% by mass) |
|---|---|---|---|---|---|---|---|---|---|---|---|---|
| JIS corrosion resisting steel | 0.098 | 0.20 | 0.69 | 0.020 | 0.0034 | 0.029 | 0.32 | 0.18 | 0.51 | | 0.0037 | 0.0019 |
| Steel type A | 0.089 | 0.19 | 0.73 | 0.021 | 0.0042 | 0.024 | | 1.53 | | 0.29 | 0.0020 | 0.0016 |
| Steel type B | 0.092 | 0.20 | 0.74 | 0.022 | 0.0039 | 0.020 | 0.32 | 2.52 | | | 0.0025 | 0.0024 |

Table 4 lists the prediction of the corrosion loss after 50 years by the present invention. As listed in the table, "the JIS corrosion resisting steel>the steel type A>the steel type B" is descending order of the corrosion loss, and thus it is most preferable that the steel type B be used simply in view of corrosion resistance. In contrast, as listed in the table, "the steel type B>the steel type A>the JIS corrosion resisting steel" is descending order of cost when the steel materials are used.

Consequently, it can be seen that in the region 1, for example, it is most preferable that the steel type A, which satisfies the corrosion standard (0.3 mm or less) and is the lowest in cost, be used in view of both corrosion resistance and cost. It can be seen that in the region 2 it is most preferable that the steel type B, which is the only one satisfying the corrosion standard, be used. It can be seen that in the region 3 none of the steel materials satisfies the corrosion standard, and thus another corrosion-resistant measure such as coating is required to be applied. Thus, the method for predicting a corrosion loss according to the present invention is used, whereby the optimum metal material corresponding to a use environment can be selected.

TABLE 4

| Region | Predicted corrosion loss after 50 years (mm) | | |
|---|---|---|---|
|  | JIS corrosion resisting steel | Steel type A | Steel type B |
| 1 | 0.397 | 0.294 | 0.240 |
| 2 | 0.509 | 0.401 | 0.286 |
| 3 | 2.079 | 1.886 | 1.153 |
| Cost (thousands of yen/ton) | 91 | 128 | 139 |

The foregoing has specifically described the method for predicting a corrosion loss of a metal material, the method for selecting a metal material, and the device for predicting a corrosion loss of a metal material according to the present invention through the embodiment for performing the invention and the examples; the gist of the present invention should not be limited to these descriptions and be interpreted widely based on the descriptions of the claims. It is understood that ones changed or modified variously based on these descriptions are also included in the gist of the present invention.

The embodiment described above separately predicts the corrosion loss of the metal material in the initial 1 year (the parameter A) and the parameter indicating attenuation of the corrosion rate of the metal material (the parameter B) and predicts the long-term corrosion loss based on the corrosion loss in the initial 1 year; the standard in predicting the long-term corrosion loss is not limited to the corrosion loss in the initial 1 year.

That is to say, at the initial corrosion loss prediction step, the corrosion loss of the metal material in a given predetermined period set in advance (an initial period) may be predicted, and at the long-term corrosion loss prediction step, the long-term corrosion loss may be predicted based on the corrosion loss in the predetermined period described above.

When a corrosion loss in 1.5 years is given as A' as the initial corrosion loss, for example, it is considered that a prediction expression of the corrosion loss after X years from then can be described as Expression (17) below by expanding Expression (1).

$$Y = A(X/1.5)^B \quad (17)$$

where X is the number of years that has elapsed

When this expression is generalized, Expression (18) below can be obtained with A' as a corrosion loss in a certain initial period $X_0$ years and B' as an attenuation parameter based on the $X_0$ years. Using this Expression (18), a corrosion loss in the period $X > X_0$ can be calculated as a corrosion loss based on the $X_0$ years.

$$Y = A'X'^{B'} = A'(X/X_0)^{B'} \quad (18)$$

The corrosion loss A' of the metal material in the given initial period and the attenuation parameter B' are separately predicted, and as shown in Expression (18), the number of years X' that has elapsed after the initial period to the attenuation parameter B'th power can predict the long-term corrosion loss after the initial period. However, the initial corrosion loss A in Expression (1) is predicated on the corrosion loss in 1 year. Thus, the period $X_0$ in Expression (18) does not assume a case significantly deviated from 1 year; its realistic practical range is considered to be about a half year to 2 years.

REFERENCE SIGNS LIST

1 Device for predicting corrosion loss
10 Input unit
20 Database
30 Computation unit
31 Similarity degree calculation unit
32 Dimension reduction unit
33 Corrosion loss prediction unit
40 Display unit

The invention claimed is:

1. A method of predicting a corrosion loss of a metal material, the method comprising:
   inputting a prediction request point including a use period of the metal material for which a corrosion loss is desired to be predicted and second environmental parameters indicating a use environment of the metal material in the use period;
   calculating a similarity degree between first environmental parameters in corrosion loss data and the second environmental parameters in the prediction request point, the corrosion loss data including: a use period of a metal material; the first environmental parameters indicating a use environment of the metal material in the use period; and a corrosion loss of the metal material in the use period;
   dimensionally reducing the first environmental parameters in the corrosion loss data to a latent variable taking the similarity degree into consideration; and
   predicting a corrosion loss of the metal material for the prediction request point based on a prediction expression constructed using the latent variable and the similarity degree.

2. The method according to claim 1, the predicting comprising:
   predicting a first parameter indicating a corrosion loss of the metal material in a predetermined period;
   predicting a second parameter indicating attenuation of a corrosion rate of the metal material; and
   predicting a corrosion loss of the metal material in a period longer than the predetermined period based on the use period of the metal material, the first parameter, and the second parameter, when predicting the corrosion loss of the metal material in the prediction request point.

3. The method according to claim 2, further comprising predicting the corrosion loss of the metal material in the predetermined period under the second environmental parameters of the prediction request point based on the prediction expression constructed using the latent variable and the similarity degree, when predicting the first parameter.

4. The method according to claim 3, wherein the first environmental parameters and the second environmental parameters include at least one of temperature, relative humidity, absolute humidity, time of wetness, and rainfall amount and at least one of amount of airborne sea salt, amount of $SO_x$ deposition, and $NO_X$ concentration.

5. The method according to claim 2, wherein the second parameter is predicted based on the use period of the metal material for which a corrosion loss is desired to be predicted, the first environmental parameters in the corrosion loss data, and the similarity degree.

6. The method according to claim 5, wherein the first environmental parameters and the second environmental parameters include at least one of temperature, relative humidity, absolute humidity, time of wetness, and rainfall amount and at least one of amount of airborne sea salt, amount of $SO_x$ deposition, and $NO_X$ concentration.

7. The method according to claim 2, wherein the first environmental parameters and the second environmental parameters include at least one of temperature, relative humidity, absolute humidity, time of wetness, and rainfall amount and at least one of amount of airborne sea salt, amount of $SO_x$ deposition, and $NO_X$ concentration.

8. The method according to claim 1, wherein the first environmental parameters and the second environmental parameters include at least one of temperature, relative humidity, absolute humidity, time of wetness, and rainfall amount and at least one of amount of airborne sea salt, amount of $SO_x$ deposition, and $NO_X$ concentration.

9. The method of predicting a corrosion loss of a metal material according to claim 1, wherein the metal material is a steel material.

10. A method comprising:
inputting a prediction request point including a use period of the metal material for which a corrosion loss is desired to be predicted and second environmental parameters indicating a use environment of the metal material in the use period;
calculating a similarity degree between first environmental parameters in corrosion loss data and the second environmental parameters in the prediction request point, the corrosion loss data including: a use period of a metal material, the first environmental parameters indicating a use environment of the metal material in the use period, and a corrosion loss of the metal material in the use period;
dimensionally reducing the first environmental parameters in the corrosion loss data to a latent variable taking the similarity degree into consideration;
predicting a corrosion loss of the metal material for the prediction request point based on a prediction expression constructed using the latent variable and the similarity degree; and
selecting a metal material corresponding to a use environment based on the predicted corrosion loss.

11. The method according to claim 10, the predicting comprising:
predicting a first parameter indicating a corrosion loss of the metal material in a predetermined period;
predicting a second parameter indicating attenuation of a corrosion rate of the metal material; and
predicting a corrosion loss of the metal material in a period longer than the predetermined period based on the use period of the metal material, the first parameter, and the second parameter, when predicting the corrosion loss of the metal material in the prediction request point.

12. The method according to claim 11, further comprising predicting the corrosion loss of the metal material in the predetermined period under the second environmental parameters of the prediction request point based on the prediction expression constructed using the latent variable and the similarity degree, when predicting the first parameter.

13. The method according to claim 11, wherein the second parameter is predicted based on the use period of the metal material for which a corrosion loss is desired to be predicted, the first environmental parameters in the corrosion loss data, and the similarity degree.

14. A device comprising:
a database configured to store corrosion loss data including:
a use period of a metal material;
first environmental parameters indicating a use environment of the metal material in the use period; and
a corrosion loss of the metal material in the use period;
an input unit configured to input a prediction request point, the prediction request point including:
a use period of the metal material for which a corrosion loss is desired to be predicted; and
second environmental parameters indicating a use environment of the metal material in the use period; and
a processor comprising hardware, the processor being configured to:
calculate a similarity degree between the first environmental parameters in the corrosion loss data and the second environmental parameters in the prediction request point;
dimensionally reduce the first environmental parameters in the corrosion loss data to a latent variable taking the similarity degree into consideration; and
predict a corrosion loss of the metal material for the prediction request point based on a prediction expression constructed using the latent variable and the similarity degree.

* * * * *